United States Patent [19]
Weber et al.

[11] 3,847,207
[45] Nov. 12, 1974

[54] METHOD FOR DETERMINING AND CONTROLLING LIQUID COOLING SYSTEM CHARACTERISTICS

[75] Inventors: Charles W. Weber; C. Olen Rucker; Patrick L. Peavy; Pak-Fat (William) Woo; James E. Bear, all of Houston, Tex.

[73] Assignee: Brown & Root, Incorporated, Houston, Tex.

[22] Filed: Apr. 26, 1972

[21] Appl. No.: 247,703

[52] U.S. Cl............................ 165/1, 165/45, 165/36
[51] Int. Cl. ........................................... G05d 23/00
[58] Field of Search................ 165/1, 45, 12, 35, 36

*Primary Examiner*—Charles Sukalo
*Attorney, Agent, or Firm*—Burns, Doane, Swecker & Mathis

[57] ABSTRACT

A system for determining the thermal characteristics of a cooling system and controlling the cooling system in response to the determined thermal characteristics. The flow pattern of a cooling reservoir having a surface exposed to the atmosphere is represented by a plurality of water segments each representing a specified time interval, preferably equal time intervals. A thermal characteristic of the segments is determined at least periodically, preferably in response to the prevailing thermal transfer characteristics at the surfaces of the segments, and the flow pattern of the cooling reservoir is modified to accommodate the required cooling needs of the system and to prevent the discharge of cooling water into natural reservoirs if the thermal characteristics of the cooling water do not permit such discharge because of set standards. A method for at least periodically calculating the temperature of each segment from known and assumed thermal data through a trial iteration process is also disclosed.

The system can also be used to determine the thermal characteristics of a natural body of water and to describe its responses to meteorological conditions.

12 Claims, 5 Drawing Figures

3,847,207

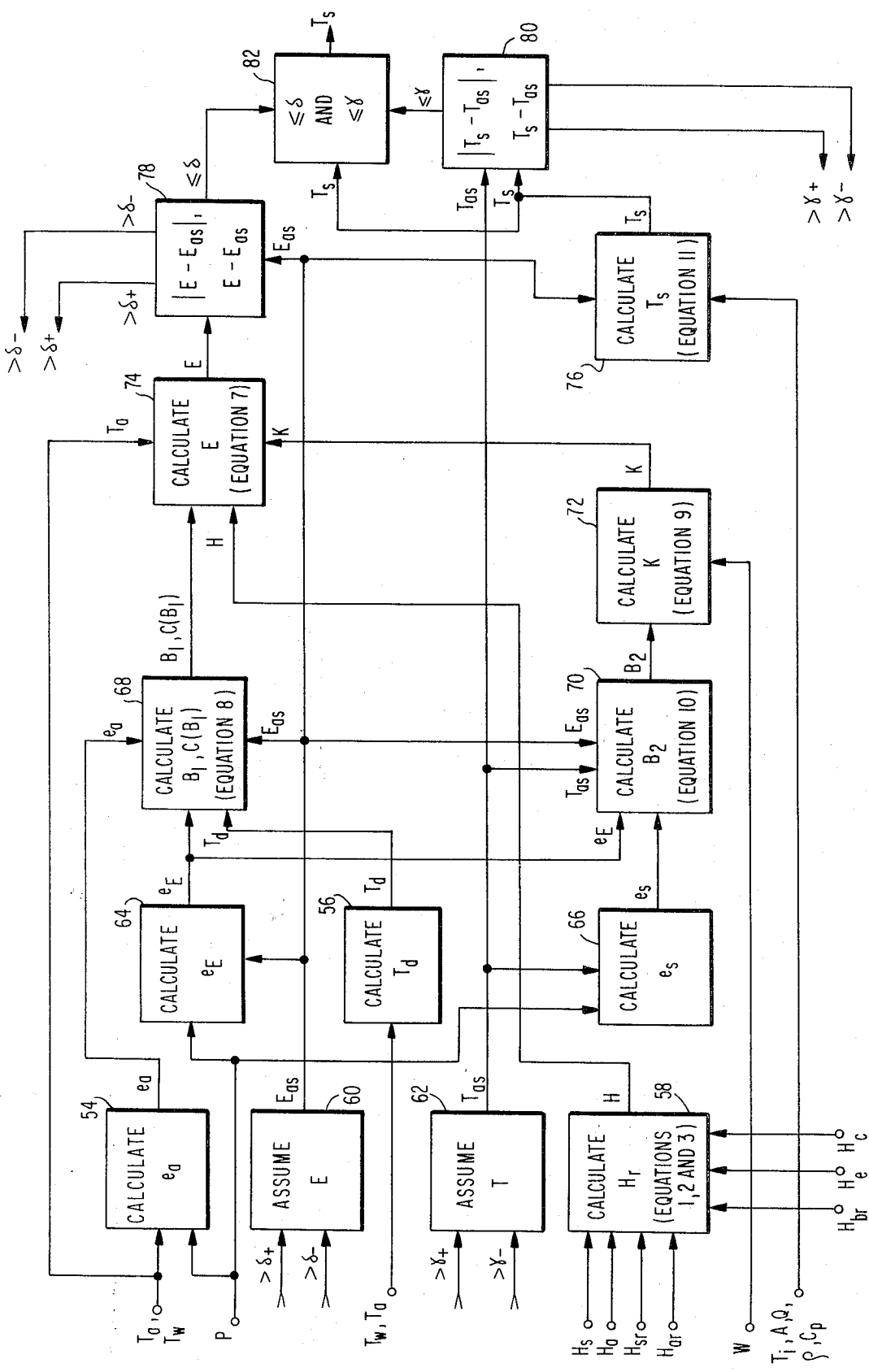

METHOD FOR DETERMINING AND CONTROLLING LIQUID COOLING SYSTEM CHARACTERISTICS

BACKGROUND OF THE INVENTION

The present invention relates to a method for determining and varying the thermal characteristics of a liquid cooling system and more particularly to a method for determining the thermal characteristics of a water cooling system having a surface exposed to the atmosphere and modifying the flow pattern of the system in response to the determined thermal characteristics.

In thermal electric power generating plants and in other manufacturing processes, water or other liquid cooling media are a necessary part of proper plant operation. Natural fresh and saline water supplies are particularly attractive from the standpoint of economy and are thus ordinarily utilized for cooling purposes in most large scale operations in which cooling is necessary. For example, large electric power generating plants require a liquid cooling media to condense the steam which drives the turbines and are thus almost exclusively situated adjacent natural water sources such as lakes and rivers so that water from the natural source may be utilized either directly for cooling purposes or as a source of make-up water for closed loop cooling reservoirs.

In the cooling system where the water is used directly, i.e., a once-through system, water from the natural reservoir is routed through the plant cooling system and is thereafter discharged into the natural reservoir. A closed loop or recirculating cooling system, on the other hand, involves the use of water from a man-made reservoir and the cooling water is circulated in a closed loop through the reservoir and the plant cooling system. In either case, the cooling water absorbs heat as it passes through the plant cooling system and the heated water is then discharged into the cooling water reservoir.

Ideally, in a closed loop, recirculating system, the cooling water should give up at least the same amount of heat which it absorbs before it is reused for cooling purposes. If not, the efficiency of the plant may suffer during periods in which maximum plant output is required. If the heated cooling water is to be discharged into a natural reservoir as in a once-through cooling system, it may be mandatory for the temperature of the discharged water to fall below a certain prescribed maximum limit before being discharged into the natural reservoir.

The thermal characteristics of any cooling system of the above-described type having a fixed surface area exposed to the atmosphere may vary immensely with plant loading conditions and prevailing meteorological conditions, both of which may be continuously changing. It may thus be particularly difficult to maximize plant efficiency and/or insure compliance with regulations concerning water discharge temperature using known closed, recirculating types of systems or once-through systems. The answer to this complex cooling problem has ofen necessarily been a costly over-design of the cooling system or merely tolerance of periods of low efficiency plant operation or periods of noncompliance with water discharge temperature standards.

Of course, an optimum solution to the problems encountered in known cooling systems may require an accurate awareness of reservoir thermal characteristics and cooling requirements for the prevailing plant load conditions. With this information available during and after the initial reservoir design stages, the type of reservoir cooling system initially selected and the method of operating that particular type of cooling system can be varied to optimize the cooling needs of the plant while maintaining the set standards of water temperature discharge.

It has been suggested that the thermal characteristics of a cooling reservoir may be determined by placing a number of thermometers or other suitable temperature sensors at predetermined locations throughout the cooling system. To employ this approach, either the temperature measured at each isolated location in the cooling system must be assumed to be representative of the overall thermal characteristics of the cooling fluid at and between each location or enough temperature measuring devices must be utilized to provide an accurate indication of the overall thermal characteristics of the cooling system. The assumption required if only a few temperature sensors are used may not be a valid assumption because of the wide temperature variations ordinarily encountered in a cooling reservoir. The use of a large number of temperature sensors may provide sufficient accuracy but may also be extremely expensive and complex. Moreover, this approach may not permit any reasonably accurate predictive studies which are highly useful in both the design of the cooling system and the planning required for its optimum use. Thus, not only may such instrumentation be extremely expensive, it may not provide the flexibility and accuracy required in applications such as power plant cooling reservoirs.

Another approach which may permit a degree of design and operation predictability on a gross or long-term basis involves the calculation of heat transfer across the exposed surface of the body of water on a longterm average basis taking into account the major mechanisms of heat transfer. For example, "The Johns Hopkins University Cooling Water Studies for Edison Electric institute", research project RP-49 by Dr. John E. Edinger et al., which is available from Edison Electric Institute, 750 3rd Avenue, New York, New York, sets forth certain equations for the transfer of heat across a water surface on a gross basis as it relates to cooling reservoirs having a surface exposed to atmosphere. The equations are based upon average climatological conditions over fairly long periods of time and thus provide gross heat exchange values which may be usable in approximating the required characteristics of the cooling system for a particular application.

Of course, the average or gross data obtained using these equations may not be useful in controlling the hour-by-hour operation of a cooling reservoir required to optimize the operation of the power plant and to maintain the cooling water discharge temperatures within the set standards. Moreover, it appears from the above Edinger et al study that a discrepancy may exist between calculated and empirical data even when calculated on an average or gross basis.

It is accordingly an object of the present invention to provide a novel method for determining the thermal characteristics of a cooling reservoir on an essentially real time basis.

It is a further object of the present invention to provide a novel method for determining the thermal characteristics of at least a portion of a cooling system at selected locations in the system whereby the cooling system may be controlled in accordance with the prevailing reservoir thermal characteristics.

It is yet another object of the present invention to provide a novel method for controlling a cooling reservoir to provide the required reservoir cooling capacity for a predetermined power plant heat load.

It is a further object of the present invention to provide a novel method for optimizing the efficiency of a power plant on an essentially real time basis in response to determined thermal characteristics of the power plant cooling system.

It is a more specific object of the present invention to provide a novel method for providing at least hourly accounting of water temperatures throughout at least a portion of a cooling system reservoir of a thermal power generating station.

It is another specific object of the present invention to provide a novel method for determining the natural equilibrium temperature of segments of a cooling system reservoir of a thermal power generating station whereby the temperatures of the segments are available on a relatively short, periodic basis for use in controlling the operation of the cooling system on a real time or predictive basis.

One embodiment of the present invention intended to accomplish at least some of the foregoing objects comprises establishing in a cooling system reservoir a plurality of reservoir segments each representing a specified time interval, preferably equal time intervals, determining an initial thermal characteristic of at least one of the segments at a first time and a predetermined location in the cooling system, thereafter determining the thermal characteristic of the at least one segment at the specified time intervals, e.g., equal time intervals after the first time, and controlling the cooling system flow pattern in response to the determined thermal characteristic.

In a preferred form of the invention, the thermal characteristic of the segment is determined by calculating the temperature of segment in response to initially determined characteristic and prevailing meteorological conditions affecting heat transfer across the surface of the segment. An equilibrium temperature is established for the segment and, to the extent that the prevailing meteorological conditions affect the equilibrium temperature, the calculated temperature of the segment is increased or decreased. This determination of thermal characteristics may also be utilized to describe the response of natural water tempeatures, i.e., natural reservoirs of water bodies, to changing meteorological conditions.

THE DRAWINGS

Other objects and advantages of the present invention will become apparent to one skilled in the art from a perusal of the following detailed description when read in conjunction with the attached drawings in which:

FIG. 1 is a schematic diagram illustrating one form of a cooling system according to the present invention;

FIG. 2 also is a schematic diagram of another form of a cooling system according to the present invention;

DETAILED DESCRIPTION

General System Description

Figure 1:
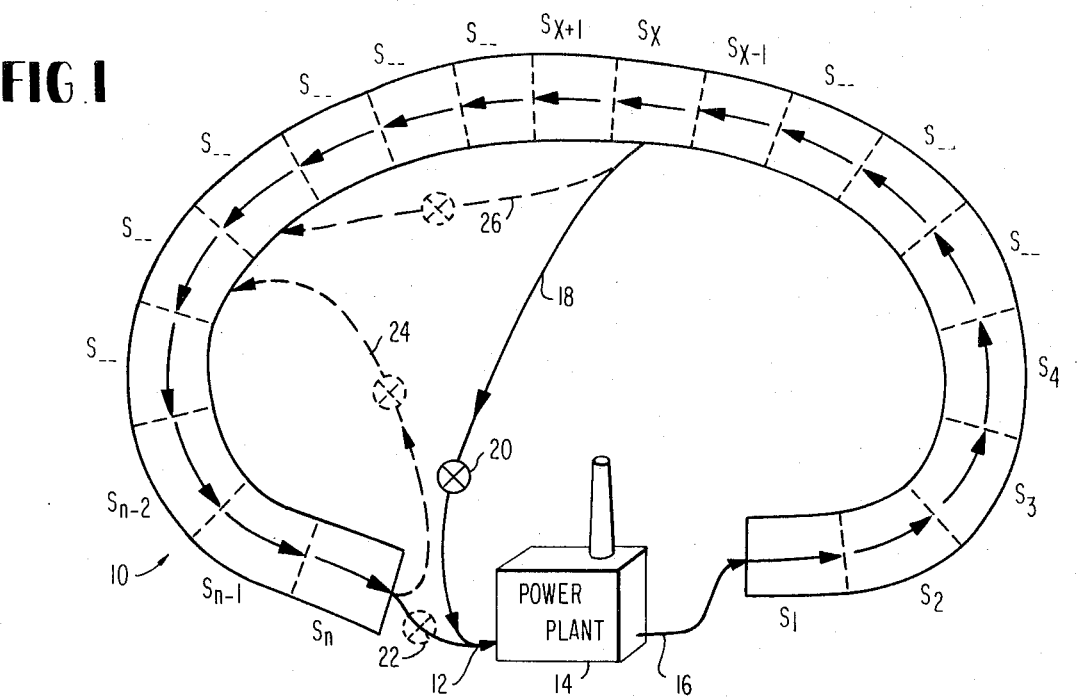
Figure 2:
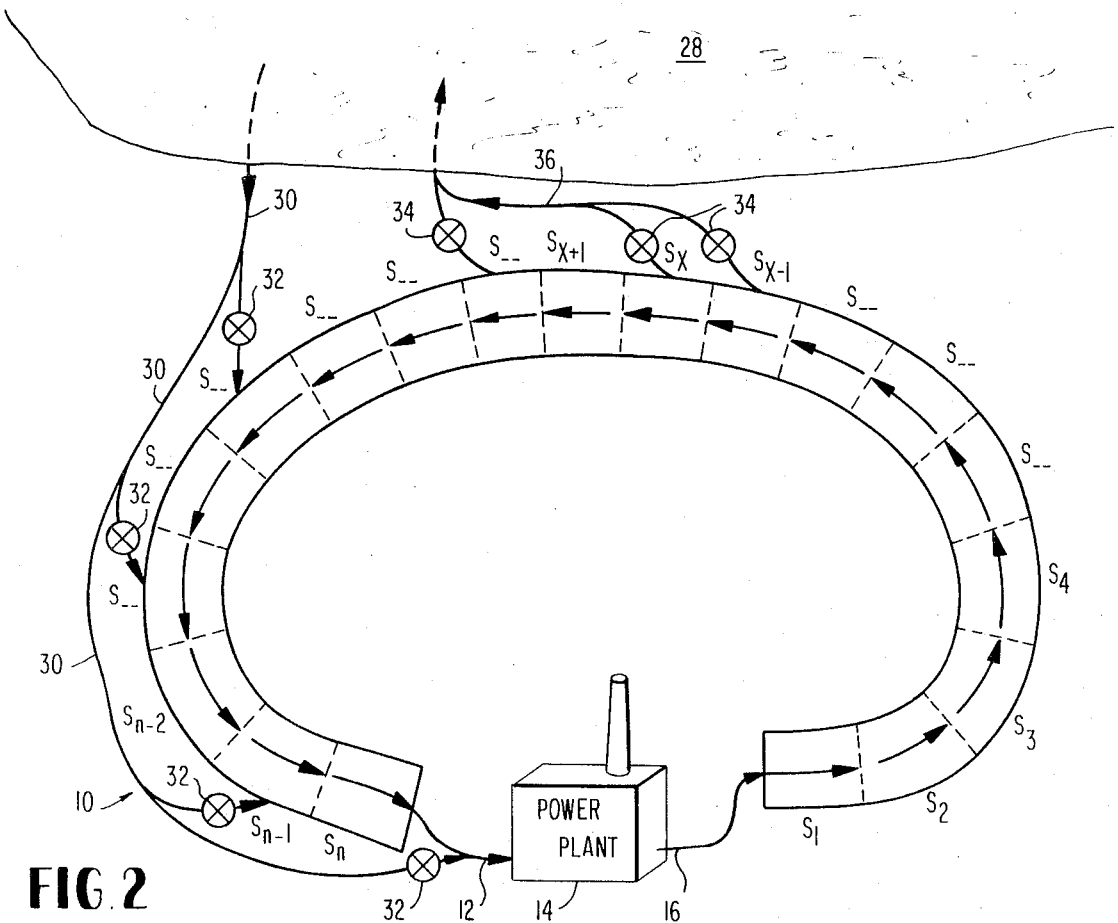
Figure 3:
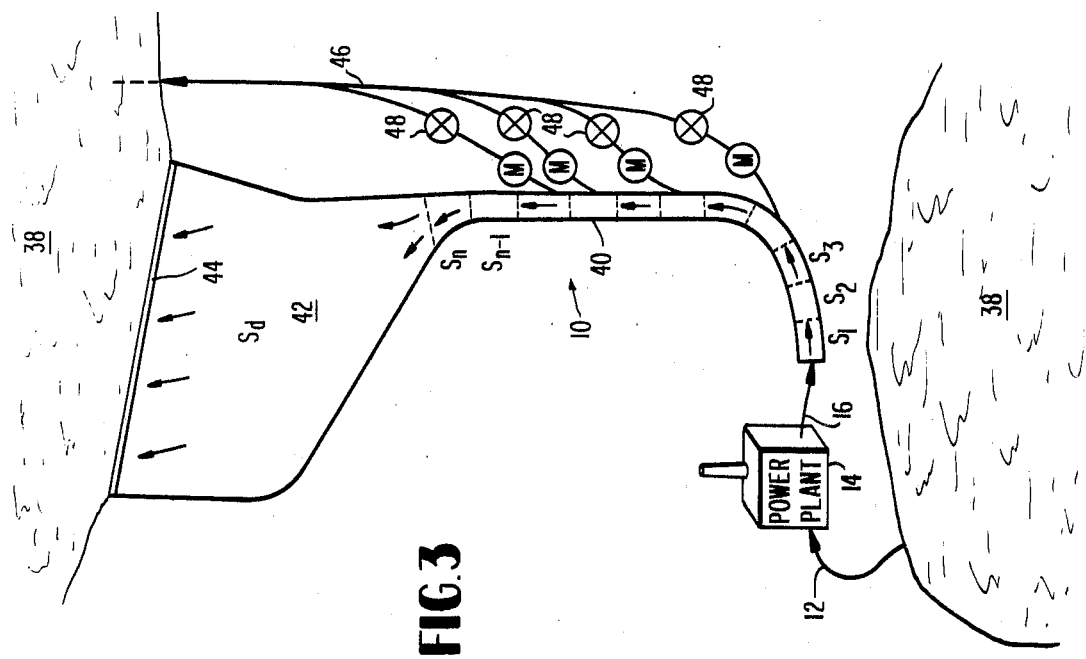
FIG. 3 is a schematic diagram illustrating another form of a cooling system according to the present invention.

The present invention may be most easily understood with reference to FIGS. 1–3 wherein three types of cooling reservoir systems are illustrated. In FIGS. 1–3 the method is described as applied to a cooling reservoir for a thermal power generating plant. However, it should be understood that the method may be utilized in other applications where a fluid having a surface exposed to the atmosphere is utilized for cooling purposes.

Referring now to FIG. 1 wherein a closed-recirculating cooling system is illustrated, a cooling fluid such as fresh or saline water flows from a cooling reservoir generally indicated at 10 to a cooling water intake opening 12 of a power plant 14. The cooling water is mainly utilized for cooling purposes in one or more condensers in the power plant 14 and is then discharged from the power plant 14 at an outlet point 16 into the cooling reservoir 10.

In the closed system illustrated in FIG. 1, the discharged cooling water is then slowly recirculated through the cooling reservoir with a surface exposed to the atmosphere so that the heat absorbed by the water in passing through the power plant 14 can be lost before being reused for cooling purposes.

In a thermal power generating plant such as that illustrated in FIG. 1, the temperature of the cooling water supplied to the condensers may be particularly critical at periods of peak power demand. The condensers are operated at a pressure below atmospheric pressure, i.e., at a negative gauge pressure, to assist in driving the steam turbines. Thus, if the condensers can be operated at pressures substantially below atmospheric, the efficiency of the turbines may be increased, within practical limits. However, the operating pressure of the condensers depends upon the degree of condensation of the steam introduced through the turbine and into the condenser. Of course, the degree of condensation of this steam and thus the condenser pressure is directly dependent on cooling water temperature.

The temperature of the cooling water in the reservoir 10 is related to the initial temperature of the water at the intake point 12, the total generating load of the power plant 14, e.g., the total output power of the power plant 14 in megawatts, and the prevailing meteorological conditions affecting the surface of the cooling reservoir 10. On a particularly hot, clear day, for example, in early afternoon when the demand for electrical power is ordinarily the greatest, the water discharged from the power plant 14 may be extremely warm over a two or three hour period.

According to the method of the present invention, the flow pattern of the cooling reservoir 10 may be divided into a plurality of segments each representing a specified time interval, e.g., equal time intervals. For example, as is illustrated in FIG. 1, a plurality of segments $S_1$ through $S_n$, together representing the overall flow pattern of the cooling reservoir 10, may be established. Each of the segments $S_1$–$S_n$ may represent an equal time interval, e.g., one hour, during which a segment such as the segment $S_3$ will be displaced in the indicated direction of flow by the immediately preceding segments, i.e., the segment $S_2$.

Each segment of water in the cooling reservoir 10 may be accounted for at all times in this manner. By determining a thermal characteristic, for example, the average temperature, of each segment on a periodic basis, the overall thermal characteristics of the cooling reservoir are available and the flow pattern of the cooling reservoir may be altered as necessary to obtain maximum power plant operating efficiency. For example, assuming that each segment represents a time interval of one hour, the segments $S_3$, $S_2$ and $S_1$ may represent the respective time intervals 12–1 p.m., 1–2 p.m., and 2–3 p.m. The segments $S_1$–$S_3$ might therefore represent those segments of the cooling reservoir water having the highest temperature of all segments in the cooling reservoir. As time advances and cooling water continues to flow from the discharge point 16 of the power plant 14, the segments flow through the cooling reservoir until they reach the intake point 12.

When the segment $S_3$ representing the time interval 12–1 p.m. reaches the end of the cooling reservoir adjacent the intake point 12, this segment is at that time designated $S_n$ since, at each selected time interval the subscript of each segment is incremented and after n time intervals, the segment $S_1$ has moved completely around the reservoir 10. Moreover, the temperature of this segment, then designated $S_n$, will have changed due to thermal transfer, primarily across the surface of the cooling water segment. However, although the temperature of the now designated segment $S_n$ may be considerably less than when it was initially discharged from the power plant into the cooling reservoir, its temperature may be higher than desired for condenser cooling.

On the other hand, a segment $S_x$ which may have been discharged from the power plant 14 during the late evening or early morning hours, may be much cooler than the segment $S_n$. It may thus be desirable to divert cooling water from the segment $S_x$ and either mix this water with the cooling water represented by the segment $S_n$ or use the water represented by the segment $S_x$ exclusively for cooling purposes in the power plant 14. This may be particularly advantageous during periods of peak load when maximum efficiency is essential.

In accordance with the present invention, a conduit or other suitable flow path generally indicated at 18 may be provided between various segments and either the power plant intake 12 or other segments of the cooling reservoir so that the flow pattern of the reservoir may be modified in response to the thermal characteristics of the various segments. A suitable control means such as the schematically illustrated valve 20 may be provided in the flow path 18 to provide control of water flow along the flow path 18 and thereby permit the selective modification of the flow pattern of the cooling reservoir 10.

For example, the flow path 18 may be provided between the segment $S_x$ and the intake point 12 of the power plant 14 as illustrated in FIG. 1. When it is determined that the temperature of the cooling water designated by the segment $S_n$ is undesirably high, cooling water from the segment $S_x$ may be diverted directly to the cooling water intake point 12 through the flow path 18 by opening the valve 20. This diverted water may be mixed with the water drawn from the cooling reservoir segment $S_n$ or may be used exclusively for cooling purposes by closing a valve indicated in phantom at 22 and/or diverting the cooling water represented by the segment $S_n$ to another point in the cooling reservoir as is generally indicated in phantom at 24.

Of course, the flow pattern of the cooling reservoir may be modified in various manners to provide the desired thermal characteristics of the cooling water at the intake point 12 of the power plant 14. For example, as is generally indicated in phantom at 26, cooling water may be diverted from one segment to another segment to provide the desired thermal characteristics in the other segment.

The flow pattern shown in FIG. 1 can be used also to describe the response of natural water temperatures to changing meterological conditions. For this type operation the power plant heat load at point 14 is assumed to be zero and each segment responds to changing climatic conditions as it proceeds through the flow pattern shown in FIG. 1.

A system which may be employed as an alternative or an adjunct to the system of FIG. 1 for selectively modifying the flow pattern of a cooling reservoir in response to its thermal characteristics is illustrated in FIG. 2.

With reference now to FIG. 2, wherein like numerical designations have been utilized to indicate previously described portions of the system, the cooling reservoir 10 for the power plant 14 may be located adjacent a natural reservoir 28 such as a lake, river or other large body of fresh or saline water. Since a large surface area of the cooling reservoir 10 is generally exposed atmosphere, a large evaporative loss of water generally occurs. Make-up water from the natural reservoir 28 is thus added to the cooling reservoir 10 periodically. This make-up water is generally cooler than the cooling water in the reservoir 10 and, in accordance with the present invention, may be added in such a manner that the flow pattern of the cooling reservoir is modified when modification of the flow pattern is deemed most necessary in view of the determined thermal characteristics of the reservoir 10.

With continued reference to FIG. 2, a plurality of water intake conduits 30 may be provided between the natural reservoir 28 and the various segments of the cooling reservoir 10. Each of the intake conduits may be provided with a valve 32 or other suitable means for controlling the flow of water therethrough to the selected points in the cooling system. When it is determined that the temperature of the segments approaching the intake point 12 of the power plant 14 is too high, the valves 32 may be selectively operated to modify the flow characteristics of the cooling reservoir 10 and thereby provide water at a desired temperataure at the intake point 12 of the power plant 14 for condenser cooling.

This system may be particularly advantageous if the natural reservoir 28 is a large stratified body of water. The stratification permits water to be drawn for make-up purposes from the cooler lower portion or hypolimnion which exists during the summer months when cooling problems are most severe. However, it should be noted that the amount of water which can be added at selected times and in selected segments of the cooling reservoir 10 is limited by the physical size of the reservoir 10 and the amount of the evaporative water loss.

In this respect, it may be possible to discharge water comprising selected segments of the cooling reservoir 10 during or immediately preceding period of peak power demand so that the cooler water from the natural reservoir 28 may be utilized almost exclusively during these period. For example, the temperature of the water represented by the segments $S_x$ and $S_{x-1}$ in FIG. 2 may be sufficiently cool to meet the established standards for discharge into the natural reservoir 28. However, the temperature of this water may be somewhat higher than the water available from the hypolimnion of the natural reservoir 28 and, although sufficiently low to permit discharge into the natural reservoir 28, may be too high to permit operation of the power plant 14 at maximum efficiency.

To permit operation of the power plant at peak efficiency during peak periods of maximum demand, the flow pattern of the cooling reservoir 10 may be thus further modified by discharging water from the segments $S_x$ and $S_{x-1}$ through the opening of suitable valves or other control means 34 in discharge conduits leading from these segments to the natural reservoir 28. Alternatively, the water from these segments $S_x$ and $S_{x-1}$ may be removed from the cooling reservoir 10 and stored during peak power demand periods to permit the use of sufficient quantities of water from the natural reservoir 28. At a later time when power demand is less, the stored water may be returned to the cooling reservoir 10 while water from other, cooler segments is discharged into the natural reservoir 28 to prevent too high a water level in the cooling reservoir 10.

Referring now to FIG. 3 wherein a once-through cooling system is illustrated schematically, cooling water for the power plant 14 is drawn from a natural body of fresh or saline water 38 via the cooling water intake 12 and is discharged at the discharge point 16 into the cooling reservoir 10. The cooling reservoir 10 may include a discharge cooling canal 40 and a discharge cooling basin 42 into which the canal 40 empties. The discharge basin 42 may be separated from the natural reservoir 38 by one or more conventional weir gates generally indicated at 44 so that the discharge of water from the discharge basin 42 into the natural reservoir 38 may be controlled.

A plurality of segments $S_1$-$S_n$ may be established in the cooling canal 40 as previously described, each of the segments representing an equal time interval. After the water used for condenser cooling in the power plant 14 is discharged into the canal 40, the thermal characteristics of the water represented by the segments $S_1$-$S_n$ are periodically determined and accounted for as will hereinafter be described in greater detail. As for the water in the discharge basin 42, it can be assumed that, for the most part, this water is thoroughly mixed and may thus be accounted for as a single segment $S_d$.

In the cooling system illustrated in FIG. 3, power plant cooling may not present problems since the cooling water is drawn directly from the natural reservoir 38. However, the cooling water discharged from the power plant 14 may be at too high a temperature to meet the standards for discharge into the natural reservoir 38 even after it has travelled the length of the canal 40 and has mixed with the water in the discharge basin 42. The temperature of the water in the basin may, however, be suitable for discharge into the natural reservoir 38 if it is stored for a period of time in the discharge basin 42 sufficient to permit the required loss across its surface. In the meantime, the temperatures of the water represented by several of the segments $S_1$-$S_n$ may be determined to be sufficiently low to meet the discharge standards and may be diverted from the discharge canal 40 through suitable conduits 46 controlled by suitable valves 48 and discharged directly into the natural reservoir 38. In this manner, the level of the water in the basin 42 may be prevented from becoming excessively high in the time period during which the water is stored in the basin 42 and allowed to cool through heat transfer to the atmosphere until the water is at a temperature which meets the discharge standards.

For example, the water representing peak operating periods of the power plant 14 may be discharged into the basin 42 and may still be too warm to be immediately discharged into the natural reservoir 38. Accordingly, the weir gate 44 may be operated to prevent the discharge of this warm water from the basin 42. While the flow of water from the basin 42 is prevented, there may be several segments in the canal 40 representing periods of relatively low power demand which may be safely discharged directly into the natural reservoir 38. Thus, the valves 48 in the conduits 46 communicating with these segments may be opened to permit water from these segments to be dumped directly into the natural reservoir 38 bypassing the basin 42. At a later time, when the temperature of the water in the basin 42 is sufficiently low for discharge, the weir gate 44 may be operated to permit discharge of water from the basin 42 and the valves 48 may be closed in coordination with the opening of the weir gates 44. Thus, the flow pattern of the cooling system may be modified responsively to the determined thermal characteristics of the cooling system to prevent excessive discharge temperatures.

Determination and Control of Thermal Characteristics

To insure accurate control of the flow pattern of the cooling system as described in connection with FIGS. 1-3, accurate data as to the thermal characteristics of the cooling system must be available at least periodically.

As was previously mentioned, a suitable temperature sensor may be disposed at a fixed location in each segment of the cooling reservoir and the temperature of each segment at this one location may be read periodically, e.g., every hour. These readings may be transmitted to some central control location, for example, as electrical signals, and there utilized to determine the manner in which the cooling system should be operated. Suitable conventional flow metering devices, for example, flow meters designated M in FIG. 3, may be provided to account for the total volume of water in the cooling reservoir so that, in the illustrated system of FIG. 3, the operation of the valves 48 and the weir gate 44 may be coordinated to control water level in the reservoir.

By way of example, the operation of the cooling system illustrated in FIG. 3 may proceed as follows: The total flow of cooling water through the power plant 14 may be some quantity A (cubic feet per hour) and the total area of the cooling reservoir 10 including the discharge canal and the discharge basin may be some quantity B (square feet). Assuming, for the purpose of explanation, that the water level throughout the reservoir 10 is some quantity C (feet), and that the control level of the weir gate 44 is also equal to C, as water is discharged into the canal 40 displacing water in the basin 42, water is discharged from the basin 42 into the natural reservoir 48.

At some time t it may be determined that the temperature of the water in the discharge basin 42 is above the maximum allowable water discharge temperature. However, it may also be determined at that same time that the temperature of the water represented by several segments in the canal 40, e.g., the segments $S_4$-$S_7$, is low enough to permit discharge into the natural reservoir 38. At that time, the appropriate control valves 48 may be opened to permit the direct discharge of water from the segments $S_4$-$S_7$ at least until it is determined at a later time that the temperature of the water in the discharge basin 42 is sufficiently low to be discharged into the natural reservoir 38. During the period in which cooling water is bypassed around the discharge basin 42 through the conduit 46, the level of the cooling reservoir 10 may be determined, by way of example, as follows:

$$C = C + (A - D)/B$$

where D is the total flow rate in cubic feet per hour through the conduit 46.

Of course, if the total amount of water discharged directly from the canal 40 into the natural reservoir 38 is equal to or exceeds the total amount of water flowing through the plant 14, the water level in the cooling reservoir 10 will remain the same or decrease. However, if the quantity of water discharged through the conduit 46 is less than the quantity of water discharged into the cooling reservoir 10 from the power plant 14, the level of the cooling reservoir 10 will rise and water will be discharged from the basin 42 into the natural reservoir 38. Accordingly, under such conditions, the weir gates 44 may be operated to prevent such discharge. At a later time when the temperature of the water in the basin 42 is sufficiently low, the valves 48 may be closed and water thereafter discharged from the discharge basin 42 into the natural reservoir 38 by changing levels of the weir gates 44.

As was previously discussed, the use of a single temperature sensor in each segment of the cooling reservoir to determine the required thermal characteristics may not provide sufficiently accurate results for some applications. Thus, a plurality of temperature readings may be taken throughout each segment at least periodically and averaged to provide an average temperature of each segment. This, of course, requires much more expensive instrumentation.

Figure 4:
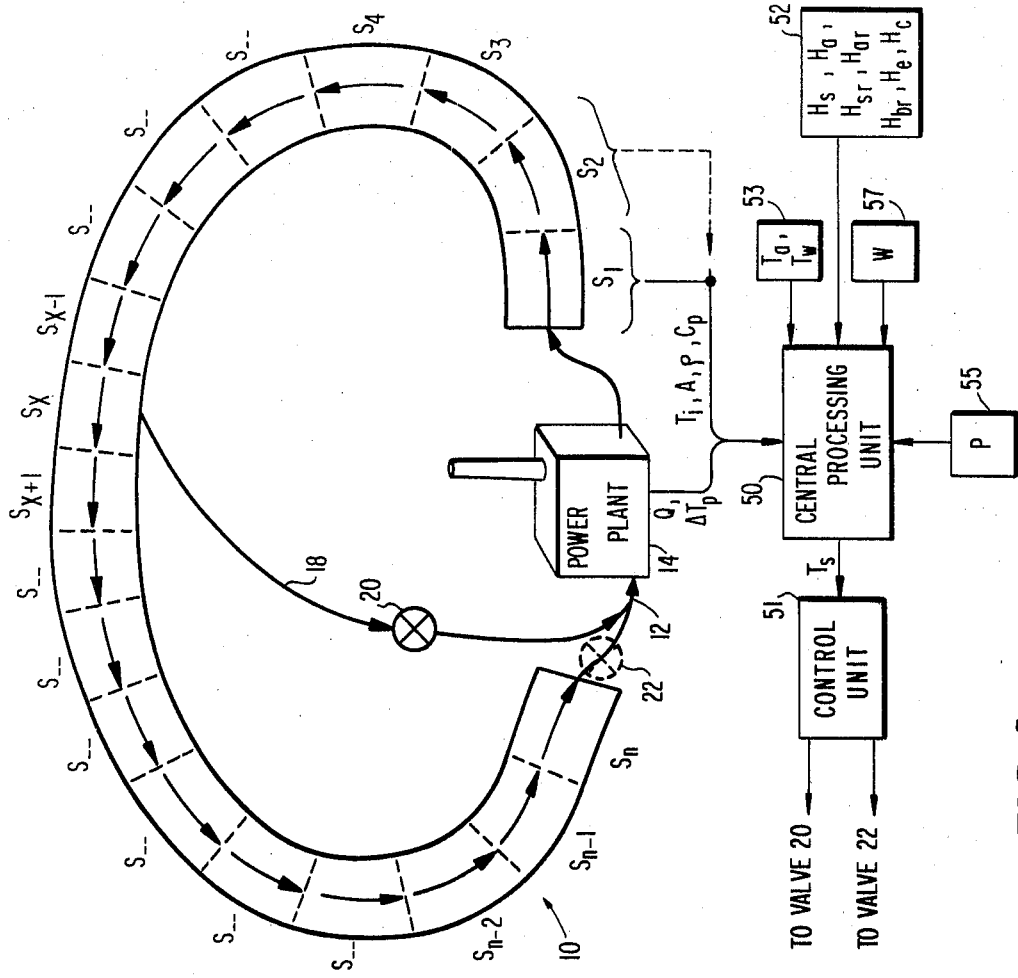
FIG. 4 is a schematic diagram functionally illustrating a method according to the present invention for determining the thermal characteristics of a cooling system; and, FIG. 5 is a functional block diagram illustrating the operation of the central processing unit of FIG. 4.

To provide reliable data as to the thermal characteristics of the cooling reservoir, both for control purposes on a real time basis and for predictive studies, the temperature of the various segments may be determined and the segments accounted for in accordance with the system illustrated in FIGS. 4 and 5. In this system, the temperature of each segment is calculated periodically, e.g., on an hourly basis, in accordance with the conditions which affect the transfer of heat across a water surface.

Before proceeding with a description of FIGS. 4 and 5, it may be useful to first note the mechanisms by which heat is transferred to and from a body of water from atmosphere.

A body of water having a surface exposed to the atmosphere varies in temperature primarily by gaining or losing heat in an amount relating to the prevailing conditions of the atmosphere above the surface. The various mechanisms by which heat is exchanged between the water surface and the atmosphere include 1) back radiation, 2) evaporation, 3) conduction, 4) short-wave solar radiation and 5) long-wave atmospheric radiation. The first three of these heat exchange mechanisms are those by which bodies of water discharge heat to the atmosphere whereas the latter two mechanisms are those by which water primarily receives heat from the atmosphere. Thus, if the first three mechanisms exceed the latter two, the body of water discharges heat to the atmosphere and vice versa.

The transfer of heat across the surface of a body of water may be expressed as follows:

$$H = H_r - H_t \quad (1)$$

where: $H_r = H_s + H_a - H_{sr} - H_{ar}$ (radiation terms); and, (2) $H_t = H_{br} \pm H_c + H_e$ (temperature dependent terms). (3)

The various symbols utilized in the above equations are discussed in the previously referenced Edinger et al study and designate the following:

$H_s$ is the incoming short-wave solar radiation;
$H_a$ is the long wave atmospheric radiation;
$H_{sr}$ is the reflected solar radiation;
$H_{ar}$ is the reflected atmospheric radiation;
$H_{br}$ is the outgoing long-wave radiation;
$H_e$ is the heat loss due to evaporation; and,
$H_c$ is the heat loss or gain by conduction.

Incoming short-wave solar radiation $H_s$ is a measure of the radiant solar energy which passes directly through the atmosphere to the earth from the sun. The intensity of the radiant solar energy at any location on earth varies with the latitude of the location, time of day, season of the year and the amount of cloud cover. The amount of shortwave solar radiation reaching the earth's surface may be measured by a pyrheliometer and this value is generally available from weather bureaus.

Long-wave atmospheric radiation, $H_a$, depends primarily upon air temperature and humidity and increases as the moisture content of the air increases. This term adds the largest amount of heat to a body of water on warm cloudy days when direct solar radiation decreases essentially to zero. The long-wave atmospheric radiation is a complex function of many variables and is largely dependent upon the distribution of moisture, temperature, ozone, carbon dioxide and other materials within the atmosphere. It is thus generally estimated by an empirical formula rather than measured. A commonly used formula, i.e., Brunt's formula, is set forth in the previously referenced Edinger et al study and may be expressed as follows:

$$H_a = 4.15 \times 10^{-8} (T_a + 460)^4 (C + 0.031 \sqrt{e_a}) \text{ BTU F}^{+-2}\text{Day}^{-1} \quad (4)$$

where:
$T_a$ = Air temperature (Dry Bulb in °F)
$e_a$ = Air vapor pressure at $T_a$ (mm Hg)
C = Brunt Coefficient (Edinger et al., supra, at 26)

A portion of the incoming solar and atmospheric radiant energy is reflected by the water surface before it can be absorbed by the water. The reflected solar radiation, $H_{sr}$, is a function of the sun's attitude measured in degrees from the horizon, i.e., relative to the water surface, and the amount of cloud cover. The reflected atmospheric radiation, $H_{ar}$, is relatively constant at $H_{ar} = 0.03\ H_a$.

The four preceding radiation terms, $H_s$, $H_a$, $H_{sr}$ and $H_{ar}$, comprise the radiation absorbed by the water, i.e., $H_r$, and are independent of the temperature of the water upon which the radiation falls. The back radiation term, $H_{br}$, is a measure of the radiation of energy to the atmosphere from the water surface in the form of long-wave radiation and depends on water temperature. The rate at which heat is lost by the water by this mechanism is commonly computed from the Stephan-Boltzman Fourth Power Radiation Law also set forth in the previously referenced Edinger et al study at page 31 and expressed as follows:

$$H_{br} = (0.97)\ (4.15 \times 10^{-8})\ (T_s + 460)^4$$

where:

$T_s$ = water surface temperature (°F).

Another method by which heat is lost from a body of water is by evaporation. The evaporative heat loss $H_e$ is also dependent on water temperature and may be computed by an empirical relationship dependent upon wind speed and the difference between the saturated water vapor pressure at the surface of the body of water and the water vapor pressure in the air above the surface (see Edinger et al., supra, p. 34).

The temperature of the body of water may be increased or decreased by heat conduction $H_c$, if the air temperature differs from the water temperature. The rate at which heat is conducted between the surface of the water and the atmosphere is equal to the product of a heat transfer coefficient and the difference in temperature between the two media, as well as the wind speed. A general equation for determining the conductive heat loss $H_c$ is also set forth in the Edinger et al. study at page 38.

The other major variable which adds heat to the cooling water in a plant cooling system is the total cooling load of the plant itself. This change in temperature of the cooling water through the plant may be empirically related to the hourly plant load for a particular plant. For example, in one thermal power generating plant having four generating units, it has been determined empirically that the temperature rise through the plant, $\Delta T_p$, may be expressed as follows:

$$\Delta T_p = 1.491 + 0.00433\ (L_1 + L_2) + 0.00726\ (L_3 + L_4) \quad (6)$$

where:

$L_1 - L_4$ are the hourly loads in megawatts for the various generating units 1-4, respectively, based upon constant flow rates for the various units.

It can be seen from the above equations for heat transfer across the water surface that there will be no heat transfer when the total heat lost across the water surface is equal to the total heat gained. This condition may be termed an equilibrium condition in that the net change in heat across the water surface is zero. This equilibrium condition is dependent upon numerous variables and may be expressed as follows:

$$E = (H - 1801/K) + (K - 15.7/K)\{(0.26 T_a/0.26\ B_1) + [e_a - C(B_1)/0.26 + B_1\} \quad (7)$$

where:

$E$ = variable dependent equilibrium temperature (°F);
$H$ = total absorbed radiation (BTU/sq.ft./day);
$T_a$ = dry bulb air temperature (°F);
$B_1$ = proportionality factor for the temperature vs. vapor pressure relationship (mm Hg/°F);
$K$ = variable heat exchange coefficient (BTU/sq.ft./day/°F); and, $C\ (B_1)$ = proportionality intercept for temperature vs. vapor pressure relationship (mm Hg).

The total absorbed radiation, H, may be determined by algebraically summing all of the radiation terms as was previously described (equation (2)). The value of H may be calculated as previously described from climatological data obtained from either a weather bureau or conventional instrumentation at the plant site. The dry bulb air temperature, $T_a$, may also be obtained in this manner.

However, the variable heat exchange coefficient K and the proportionality factor $B_1$ must be calculated, respectively, from the following equations:

$$B_1 = e_E - e_a/E - T_d \quad (8)$$

where:

$e_a$ = air vapor pressure at $T_a$ (mm Hg);
$e_E$ = saturation vapor pressure at E (mm Hg);
$T_d$ = air dewpoint temperature (°F);

$$K = 15.538 + 2.929\ (1 + 0.01\ w^2)\ (6.24 + 24 B_2) \quad (9)$$

where:

$w$ = wind speed (MPH); and,
$B_2$ = proportionality factor for temperature vs. vapor pressure relationship (mm Hg/°F).

The proportionality factor for temperature vs. vapor pressure relationship $B_2$ may be expressed as follows:

$$B_2 = e_s - e_E/T_s - E \quad (10)$$

where:

$e_s$ = saturation vapor pressure at water temperature $T_s$ (mm Hg);
$e_E$ = saturation vapor pressure at E (mm Hg); and,
$T_s$ = water temperature (°F).

It can be seen from the above that most of the variables in these equations are obtainable by measuring the climatological conditions in the vicinity of the power plant or by obtaining these values from the local weather bureau. However, it can also be seen that the equilibrium temperature E, the variable heat exchange coefficient K and the water temperature $T_s$, which is to be determined, are interdependent.

The temperature $T_s$ can be equated to the variable dependent equilibrium temperature, E, the variable dependent exchange coefficient K, the initial temperature $T_i$ of the water at some time $t_1$ and other climatological variables as follows:

$$T_s = [(T_i - E)/e(kA/\rho C \rho Q)] + E \quad (11)$$

where:

$T_s$ = water temperature of a segment in degrees F at time $t_2$
$\rho$ = density of water in lbs. per cubic ft;

$C_p$ = specific heat of water BTU/lb/°F;
A = surface area in square feet exposed to atmosphere; and,
Q = reservoir flow rate in cubic feet/day.
e = base of natural logarithms (2.178)

From the previous equations, it may be seen that most of the variables may be obtained manually using conventional meters at the plant site or by obtaining the readings from a local weather bureau. These readings may then be plugged into the equations and the temperature $T_s$ is calculated for each segment through a successive trial iteration method, i.e., by assuming values of E and $T_s$ and changing these values until the assumed values equal the calculated values.

Preferably, however, the terms which vary with climatological conditions are obtained at various locations at the plant site and transmitted as electrical or other suitable signals to a central processing unit generally indicated at 50 in FIG. 4. For example, the variable terms $H_{br}$, $H_c$, $H_e$ $H_a$, $H_{sr}$ and $H_{ar}$ may be obtained using appropriate conventional instrumentation and by making certain known calculations, as was previously described and as indicated at 52 in FIG. 4. The dry bulb and wet bulb temperatures $T_a$ and $T_w$ may be provided from a conventional dry bulb and wet bulb thermometer, respectively, generally indicated at 53, and the wind speed w may be provided from a suitable conventional cup or propellor anomometer 57.

The barometric pressure P may be measured in any suitable conventional manner as is generally indicated at 55 and provided at the central processing station 50. The surface area A for each segment, the water density $\rho$, and the specific heat of water $C_p$, may be a predetermined and stored value which the central processing unit 50 can read from memory when needed. The quantities Q and $\Delta T_p$ (equation 6) may be calculated in accordance with the number of generating units in operation when the thermal characteristics of the segments are desired.

The quantity $T_i$ is the stored value of the water segment temperature calculated during the immediately preceeding time interval. When the process is initially started, the initial temperature may be measured or approximated and thereafter utilized to calculate the periodic segment temperatures. An error in the initial calculation or approximation is eliminated after the cooling water has cycled a few times.

The central processing unit 50 uses this data relating to the prevailing meteorological conditions on at least a periodic basis to determine the temperature $T_s$ of each of the segments of the cooling reservoir 10. The temperatures $T_s$ may then be indicated or printed out to permit manual control of the valves which control the flow pattern of the cooling reservoir 10. Alternatively, the temperatures $T_s$ may be applied to a valve control unit 51 which may, in turn, correlate the temperature data of the segments in any suitable conventional manner and generate valve control signals for automatic control of the flow pattern of the cooling reservoir 10 as was discussed in connection with FIGS. 1–3.

The central processing unit 50 may solve equation (11) through successive trial iteration in the manner functional illustrated in FIG. 5. Referring now to FIG. 5, the temperatures $T_a$, $T_w$ and the barometric pressure P are utilized to calculate the air vapor pressure $e_a$ in a suitable conventional manner, as is indicated at 54.

The dry and wet bulb air temperatures $T_a$ and $T_w$ are utilized to calculate the dewpoint temperature $T_d$ in a conventional manner, as is indicated at 56.

The total absorbed radiation H is calculated by algebraically summing the terms $H_{br}$, $H_c$, $H_e$ $H_s$, $H_a$, $H_{sr}$, and $H_{ar}$, in accordance with equation (1), as is indicated at 58. However, the remainder of the calculations must be accomplished by trial iteration by assuming an equilibrium temperature $E_{as}$ and a water temperature $T_{as}$, as is indicated at 60 and 62, respectively.

After having assumed initial values of $E_{as}$ and $T_{as}$, these values are utilized, together with the barometric pressure P, to calculate the respective saturation vapor pressures $e_E$ and $e_s$ at these temperatures in a conventional manner, as is indicated at 64 and 66, respectively. The vapor pressures $e_E$ and $e_a$, the dewpoint temperature $T_d$, and the assumed equilibrium temperature $E_{as}$ are then used to calculate the proportionality factor and the proportionality factor intercept $B_1$ and $C(B_1)$, respectively, in accordance with equation (8), as is indicated at 68. The vapor pressures $e_E$ and $e_s$, together with the assumed equilibrium temperature $E_{as}$ and the assumed water temperature $T_{as}$ are utilized to calculate the proportionality factor $B_2$, in accordance with equation (10), as is indicated at 70.

The variable dependent exchange coefficient K is then calculated in accordance with equation (9) using the calculated proportionality factor $B_2$ and the wind speed w, as is indicated at 72, and the actual equilibrium temperature E is calculated in accordance with equation (7) from the values of $B_1$, $C(B_1)$, H, $T_a$, and K, as is indicated at 74. Likewise, the actual water temperature $T_s$ is determined in accordance with equation (11), as is indicated at 76, using the values of the initial temperature $T_i$ and the area A of the particular segment for which the temperature $T_s$ is desired, and using the known values of water density $\mu$, specific heat of water $C_p$, and the flow rate through the reservoir Q. When the cooling system has been operating for a predetermined period of time, e.g., one day, the initial segment temperature $T_i$ may be the temperature of that segment calculated and stored during the immediately preceding time period.

The calculated values of equilibrium temperature E and the temperature $T_s$ of the water segment may then be compared, respectively, to the corresponding assumed values, as is indicated at 78 and 80. Predetermined tolerances $\delta$ (for the equilibrium temperature comparison) and $\gamma$ (for the water temperature comparison) may be used as tolerances within which the differences between the calculated and assumed values must fall before the calculated water segment temperature $T_s$ can be provided as an output quantity.

For example, if the absolute value of the difference between the calculated equilibrium temperature E and the assumed equilibrium temperature $E_{as}$ is less than or equal to the predetermined tolernace $\delta$, an enabling signal may be provided at an output gate 82. Likewise, if the difference between the calculated segment temperature $T_s$ and the assumed segment temperature $T_{as}$ is less than or equal to the predetermined tolerance $\gamma$, an enabling signal is applied from the comparator 80 to the output gate 82. If both enabling signals are present at the output gate 82 simultaneously, the calculated value of segment temperature $T_s$ is provided as an output quantity, as is illustrated in FIG. 5.

However, if the predetermined tolerances δ and γ are not met, control signals (>δ−, >δ+) and (>γ−, >γ+) are generated, and either increment or decrement the assumed E and assumed T values $E_{as}$ and $T_{as}$ in accordance with the sign of the control signals. The process is then repeated, using the new values of $E_{as}$ and $T_{as}$, and is further repeated if necessary until the tolerances δ and γ are met.

While the quantity $\Delta T_p$ is not shown as being used in the calculation of $T_s$, one or more segments may be established through the power plant 14 (FIGS. 1–4) and the new temperatures of these segments may be calculated by periodically adding the quantity $\Delta T_p$ or an appropriate portion thereof to the initial temperature of the incoming segment, i.e., the plant intake temperature.

For example, the segment $S_n$ may pass entirely through the plant 14 and become the segment $S_1$ between successive temperature determinations. In this event, the entire quantity $\Delta T_p$ may be added to the temperature of the segment $S_n$ to calculate the temperature of the segment $S_1$.

The trial iterative process described in connection with FIG. 5 may be performed as illustrated, employing suitable conventional electronic hardware, e.g., analog or digital adders, subtractors, dividers, multipliers, and the like, or may be performed on a general purpose digital computer appropriately programmed to perform the functions indicated in FIG. 5. Iterative techniques suitable to perform the indicated calculations are well known in the art and may be adapted to this process by one skilled in the art.

SUMMARY OF ADVANTAGES AND SCOPE OF THE INVENTION

It is apparent from the foregoing description that the present invention offers numerous advantages over prior art methods for determining and accounting for the thermal characteristics of the cooling liquid in various types of cooling systems. The present invention permits the thermal characteristics to be determined accurately and rapidly on an essentially real time basis whereby the cooling system can be controlled on an essentially real time basis.

Using the data provided in accordance with the present invention, the flow pattern of a cooling reservoir may be controlled to maximize plant efficiency under various plant load conditions and under various climatological or meteorological conditions. Moreover, temperature standards for the discharge of cooling water into natural reservoirs may be met in accordance with the present invention.

The determination of temperatures through the use of the iterative technique of the present invention provides a convenient and highly accurate accounting of water temperatures for real time control or for predictive studies. Plant efficiency and cooling system operation can thereby be optimized in a particularly advantageous manner.

The present invention may be embodied in other specific forms without departing from the spirit or essential characteristic thereof. The presently disclosed exemplary embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for operating a liquid cooling system including a cooling reservoir having a surface exposed to the atmosphere along at least a portion of a flow path of the reservoir, the method comprising the steps of:

establishing a plurality of reservoir segments each representing specified time intervals and together representing at least a portion of an overall flow pattern of the cooling system;

determining an initial thermal characteristic of at least one of the segments at a first time and at a predetermined location in the cooling system;

at least periodically determining the thermal characteristic of the one segment at successive specified time intervals after said first time; and, modifying the flow pattern of the cooling system responsively to the determined thermal characteristics of the at least one segment.

2. The method of claim 1 wherein the thermal characteristics of the one segment are determined at least hourly in response to the initially determined thermal characteristic and the prevailing heat transfer conditions to which the surface of the segment is exposed.

3. The method of claim 1 wherein the flow pattern of the cooling reservoir is modified by changing the length of the flow path of the at least one segment through the cooling reservoir.

4. The method of claim 1 wherein the flow pattern of the cooling reservoir is modified by introducing a liquid having thermal characteristics which differ from the calculated thermal characteristics of the one segment into the cooling reservoir at a predetermined location along the flow path of the reservoir.

5. The method of claim 4 wherein the flow pattern of the cooling reservoir is further modified by discharging liquid from the one segment of the cooling reservoir.

6. A method for operating a liquid cooling system including a cooling reservoir having a surface exposed to the atmosphere along at least a portion of a flow path of the reservoir, the method comprising the steps of:

establishing a plurality of reservoir segments each representing specified time intervals and together representing at least a portion of an overall flow pattern of the cooling system;

determining an initial temperature of at least one of the segments at a first time and at a predetermined location in the cooling system;

determining subsequent temperatures of the at least one segment at specified time intervals after said first time in response to the initial temperature and prevailing thermal transfer conditions at the surface of the segment by assuming a subsequent temperature and a thermal transfer condition and calculating the actual subsequent temperature of the at least one segment by successive trial iteration; and modifying the flow pattern of the cooling system responsively to the determined temperature of the at least one segment.

7. The method of claim 6 wherein the assumed thermal transfer condition is the equilibrium temperature at the surface of the segment.

8. A method for determining the thermal characteristics of a body of water having at least a portion of a surface exposed to the atmosphere, the method comprising the steps of:

establishing a plurality of segments of the body of water each segment representing a specified time interval and together representing at least a portion of the body of water along its exposed surface;

determining an initial temperature for each of the segments at a first time and at predetermined locations in the body of water;

thereafter determining subsequent temperatures of each of the segments at specified time intervals after said first time in response to the initial temperature of each segment and prevailing thermal transfer conditions at the surface of each segment by:

assuming a subsequent segment temperature and an equilibrium temperature for each of the segments;

calculating the actual equilibrium temperature and the actual subsequent temperature for each of the segments from the assumed temperatures and the prevailing thermal transfer conditions;

comparing the values of the assumed and calculated temperatures; and, if the compared values are within predetermined tolerances, providing the calculated temperature for each segment as an output quantity;

if the compared values are outside predetermined tolerances, modifying the values of the assumed temperatures and repeating the step of calculating and comparing.

9. The method of claim 8 wherein the initial temperature of each segment comprises the temperature of that segment calculated during the immediately preceding time period.

10. The method of claim 6 wherein each of the specified time intervals which each segment represents is equal and wherein the specified time intervals at which subsequent temperatures are determined are hourly time intervals.

11. The method of claim 8 wherein each of the specified time intervals which each segment represents is equal and wherein the specified time intervals at which subsequent temperatures are determined are hourly time intervals.

12. The method of claim 9 wherein the body of water is a natural reservoir and wherein the specified time intervals at which subsequent temperatures of each segment are determined are at least hourly time intervals.

* * * * *